US005248540A

United States Patent [19]

Speckman et al.

[11] Patent Number: 5,248,540

[45] Date of Patent: Sep. 28, 1993

[54] RAMP PAD

[75] Inventors: Jerome E. Speckman, Longmont, Colo.; Harry W. Reese, Moundsview, Minn.

[73] Assignee: SR Grip, Inc., Longmont, Colo.

[21] Appl. No.: 695,512

[22] Filed: May 3, 1991

[51] Int. Cl.[5] .................... B23B 3/06

[52] U.S. Cl. .................... 428/101; 428/33; 428/141; 428/156; 428/167; 428/172; 428/174; 428/192

[58] Field of Search .................... 428/156, 167, 192, 33, 428/45, 57, 81, 99, 101, 141, 172, 174; 105/436; 14/69.5; 52/174, 175, 176; 269/58

[56] References Cited

U.S. PATENT DOCUMENTS 1,964,348 6/1934 Gammeter .................... 428/167
2,021,522 11/1935 Schacht .................... 428/167

*Primary Examiner*—Donald J. Loney
*Attorney, Agent, or Firm*—Chrisman, Bynum & Johnson

[57] ABSTRACT

A first anti-slip ramp pad has a resilient base with a plurality of elongated, raised leg grips disposed thereon in parallel, spaced-apart relation for engaging and holding the inclined ramp legs of an automobile service ramp. The base of this first anti-slip ramp pad also includes an elongated tire gripper section having a plurality of raised gripper nodules that extends outward from the ramp, so that an advancing tire will roll over the elongated tire gripper section, holding the pad and the ramp as the tire begins to travel up the automobile service ramp. A second anti-slip ramp pad similar to the first ramp pad also having a plurality of elongated, raised leg grips may be placed under the rear legs of the automobile ramp to increase the frictional engagement with the floor and further reduce the chances of ramp slippage.

10 Claims, 3 Drawing Sheets

RAMP PAD

BACKGROUND OF THE INVENTION

1. Field of the Invention

This invention relates to anti-slip pads in general and more specifically to anti-slip pads for automobile service ramps.

2. Brief Description of the Prior Art

Automobile service ramps have been used for a number of years by home mechanics and others that often need to raise their vehicles to perform various service operations, such as oil changes, drive line maintenance, suspension maintenance, and the like. Such automobile service ramps are relatively simple and inexpensive, typically being constructed from sheet steel that is stamped or pressed into the shape of a service ramp, having a ramp section, a platform section, and rear support legs. The ramps are designed so that the platform section is sufficiently high to allow easy access to the underside of the vehicle. To raise the automobile up on the service ramps, the ramps are placed adjacent the tires for the end of the automobile that is to be raised. For example, if the front of the vehicle is to be raised, the automobile service ramps would be placed in front of each front wheel. The vehicle can then driven up the inclined portion of the service ramp until the tires rest on the level platform section. Such automobile service ramps therefore dispense with the need to perform the tiresome, time consuming, and sometimes dangerous process of using a jack and jack stands to raise and support the automobile.

Unfortunately, while these automobile ramps are desirable in that they eliminate the jacking process, they do suffer at least one significant drawback. Namely, when driving the vehicle up the inclined ramp portions, the longitudinal forces exerted by the tires on the automobile ramps tends push the ramps away from the advancing tires. Because the service ramps are made of steel and because they are usually being used on concrete floors, most ramps will usually slide away from the advancing tires. This slippage can be especially annoying on smooth surfaces, such as the smooth concrete typically used for most garage floors, because the ramps usually continue to slide away from the tires, causing the tires to "chase" the ramps along the floor, making the process of driving the vehicle up the ramps a tedious and frustrating experience. Another more dangerous situation can develop if the ramps slip out from under the vehicle while the tires are advancing up or down the inclined ramp portion. The relatively low coefficient of friction between the ramp legs and the floor can cause the ramps to suddenly slip or be ejected out in front of the vehicle at rather high velocities, creating substantial risks of personal injury or property damage. Further, such ramp ejection can damage the vehicle as it suddenly falls to the ground.

Various methods have been developed by persons using such automobile service ramps to help solve this problem of ramp slippage. For example, many people brace the ramps with wooden members positioned between the rear legs of the ramp and a wall of the garage in an attempt to keep the ramps from slipping. Still others may have another person or persons physically hold the ramp from slipping while the vehicle is being driven up the ramp, creating a potentially hazardous situation for those persons holding onto the ramps.

SUMMARY OF THE INVENTION

Accordingly, it is a general object of this invention to provide a means for preventing the slippage of automobile service ramps during all aspects of the loading and unloading operations.

It is more specific object of this invention to provide a means of preventing automobile service ramps from being pushed away by the tires of the vehicle during the initial loading stage.

It is another more specific object of this invention to provide a means of preventing automobile service ramps from slipping out from under the vehicle while the vehicle is part way up the ramps.

It is another object of this invention to provide a ramp pad that will reduce or prevent automobile ramp slippage even on relatively slippery surfaces such as smooth concrete floors.

It is a further object of this invention to provide a ramp pad that can be used with a wide range of currently available automobile service ramps.

Additional objects, advantages, and novel features of the invention shall be set forth in part in the description that follows, and in part will become apparent to those skilled in the art upon examination of the foregoing or may be learned by the practice of this invention. The objects and advantages of the invention may be realized and attained by means of the instrumentalities and in combinations particularly pointed out in the appended claims.

To achieve the foregoing and other objects, and in accordance with the purpose of the present invention, as embodied and broadly described herein, the anti-slip ramp pads according to this invention may comprise a first anti-slip ramp pad having resilient base with a plurality of elongated, raised leg grips disposed thereon in parallel, spaced-apart relation for engaging and holding the inclined ramp legs of an automobile service ramp. The base of this first anti-slip ramp pad also includes an elongated tire gripper section extending outward in front of the ramp, so that a tire advancing up the ramp will first roll over the elongated tire gripper section, preventing both the pad and the ramp from being pushed away from the advancing tire. A second anti-slip ramp pad similar to the first ramp pad also having a plurality of elongated, raised leg grips may be placed under the rear legs of the automobile ramp to further reduce the chances of service ramp slippage.

BRIEF DESCRIPTION OF THE DRAWINGS

The accompanying drawings, which are incorporated herein and form a part of this specification, illustrate the preferred embodiment of the present invention, and together with the description, serve to explain the principles of the invention. In the drawings.

DETAILED DESCRIPTION OF THE PREFERRED EMBODIMENT

Figure 1:
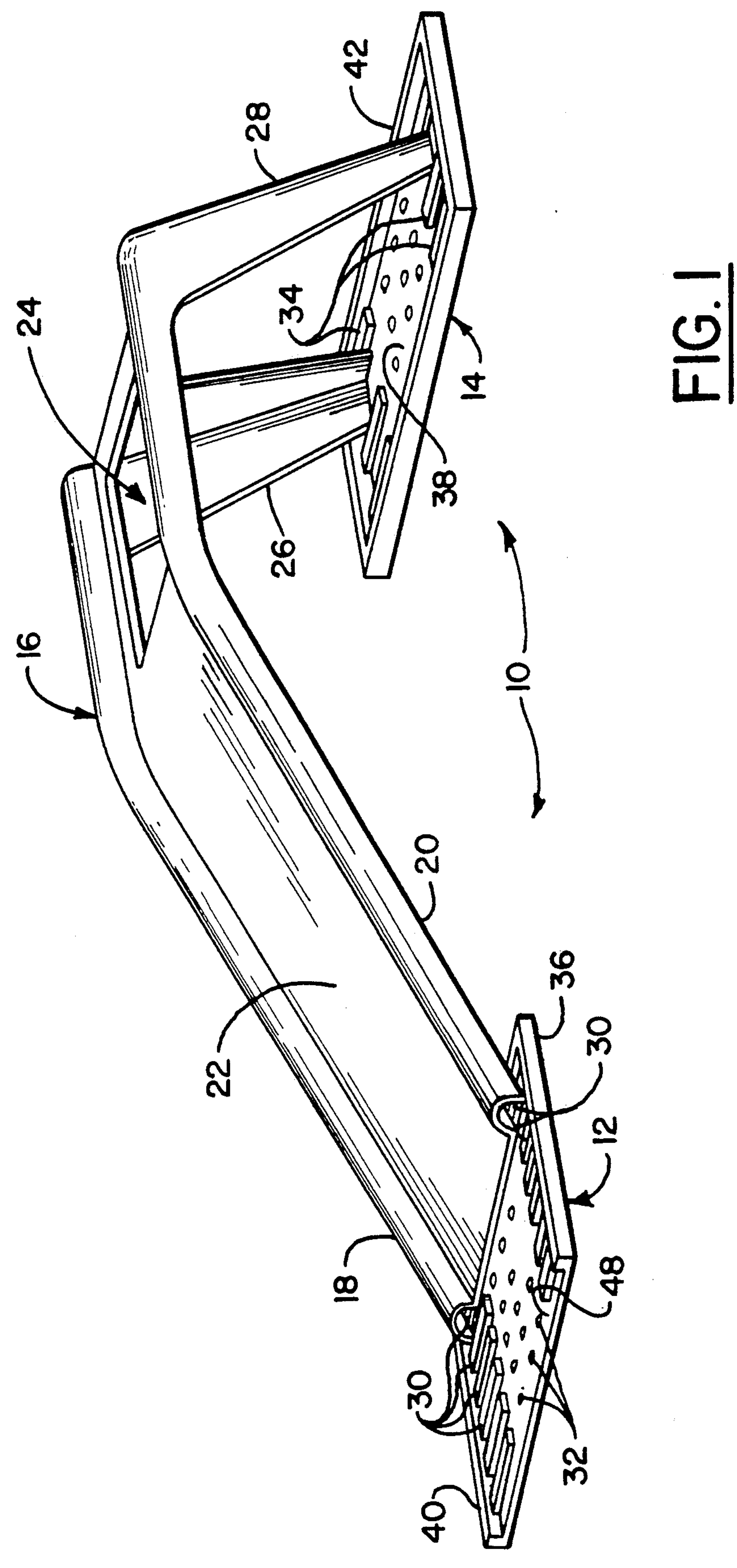
FIG. 1 is a prospective view of the anti-slip ramp pads according to the present invention, showing the elongated tire gripper section and showing how the anti-slip ramp pads are positioned under the inclined ramp legs and rear legs of a typical automobile service ramp.

The first and second anti-slip ramp pads 10 according to the present invention are best seen in FIG. 1 and comprise a first anti-slip ramp pad 12 and a second, or rear leg, anti-slip ramp pad 14 that are preferably made from a tough, but resilient material, such as polyvinyl chloride (PVC), polyurethane, rubber, or polypropylene. The first and second anti-slip ramp pads 12 and 14 are respectively positioned under a service ramp 16 having an inclined or ramp section 22 and a horizontal section 24 that are supported by inclined ramp legs 18, 20, and rear legs 26, 28, as best seen in FIG. 1. More specifically, the first and second anti-slip ramp pads 12 and 14 are positioned under the inclined ramp legs 18, 20 and the rear legs 26, 28, respectively, of automobile service ramp 16. A plurality of elongated, raised leg grips 30 on the base 36 of anti-slip ramp pad 12 engage the ramp legs 18, 20, thereby holding and securing the ramp 16 to the anti-slip pad 12. Similarly, a plurality of elongated, raised rear leg grips 34 on the base 38 of rear leg ramp pad 14 engage and hold the rear legs 26, 28 of service ramp 16, as best seen in FIG. 1. The interlocking actions of these elongated, raised leg grips 30 on pad 12 and rear leg grips 34 on pad 14, securely hold the service ramp 16 to the anti-slip pads 12 and 14, which provide a much better frictional engagement with the floor surface than possible with the metal legs 18, 20, 26, and 28, thereby substantially reducing the tendency of the service ramp 16 to slip during any stage of the loading or unloading procedure. See FIG. 2.

Figure 2:
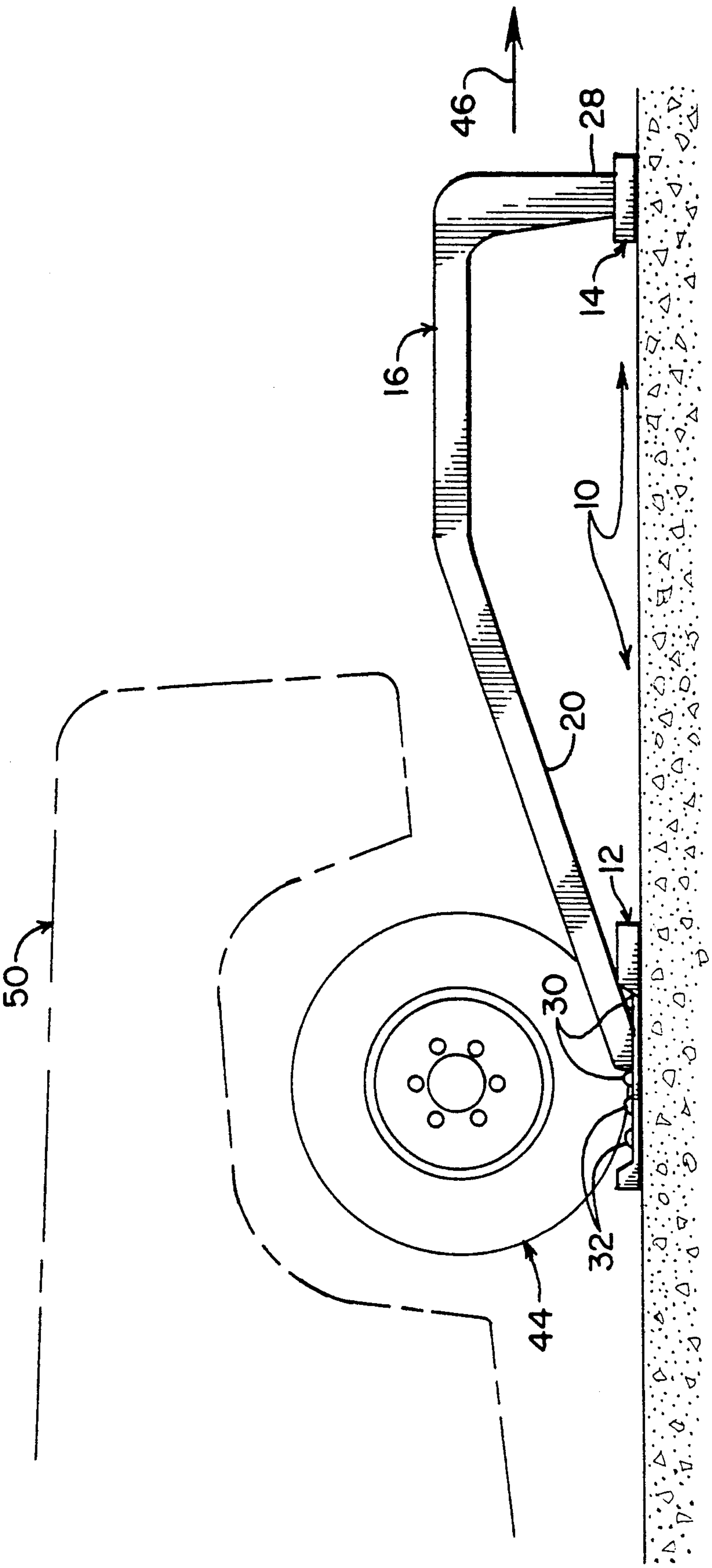
FIG. 2 is a side view in elevation of the anti-slip ramp pads according to the present invention with a parameter wall of the anti-slip ramp pad broken away to show the engagement of the automobile tire with the elongated tire gripper section.

Another important feature of this invention is the elongated tire gripper section 48 that extends outward from the ramp portion 22 of service ramp 16, as seen in FIGS. 1 and 2. This elongated tire gripper section 48 prevents the ramp 16 from being pushed along the floor in front of the advancing tire 44 during the initial loading operation, because the advancing tire 44 rolling over the tire gripper section 48 securely holds the ramp pad 12 against the floor, thus preventing the service ramp 16 from slipping, as is best seen in FIG. 2. Therefore, this elongated tire gripper section 48 in combination with the enhanced frictional engagement with the floor provided by the anti-slip pads 12 and 14, effectively prevents the automobile ramp 16 from sliding in the direction of arrow 46 at any time during the loading or unloading operations, thereby increasing safety and reducing the chances of property damage.

Figure 3:
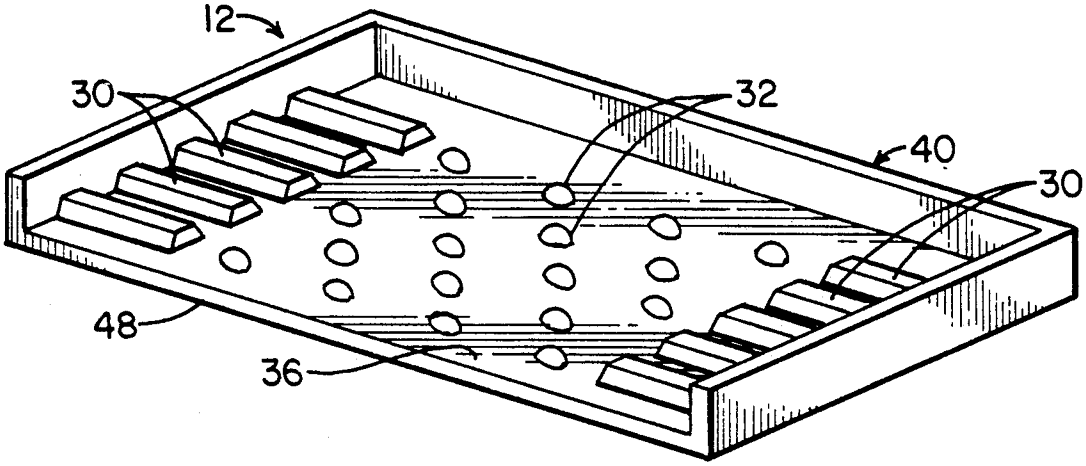
FIG. 3 is a perspective view of the first anti-slip ramp pad according to the present invention, more clearly showing the elongated raised leg grips, parameter walls, and raised nodules on the elongated tire gripper section.
Figure 4:
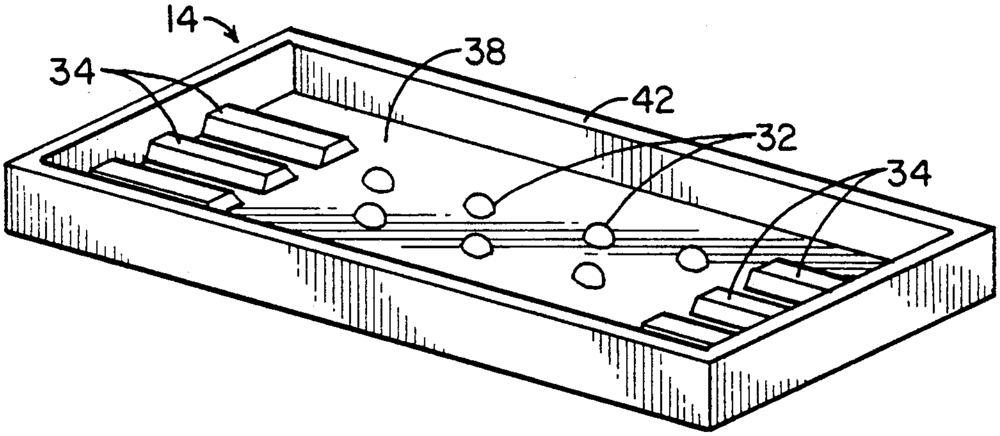
FIG. 4 is a perspective view of the second anti-slip ramp pad according to the present invention showing the parameter wall and the elongated, raised rear leg grips.

The details of the ramp pads 12, 14 according to the present invention are best seen by referring to FIGS. 3 and 4 with occasional reference back to FIGS. 1 and 2. Referring now to FIG. 3, the first anti-slip ramp pad 12 comprises a base 36 surrounded on three sides by a perimeter wall 40. This perimeter wall helps to properly laterally locate and hold the legs 18 and 20 of ramp 16 on the pad 12 and provides added dimensional stability to the pad 12. A plurality of elongated, raised leg grips 30 in parallel, spaced-apart relation extend from the opposed side walls 40 toward the center portion of the base 36. These leg grips 30 are spaced a sufficient distance apart to accommodate a wide variety of ramp leg profiles and sizes. These elongated, raised leg grips 30 also extend inboard towards the center portion of the pad 12 a sufficient distance to accommodate varying widths of automobile service ramps. For example, the inclined ramp legs of relatively wide service ramps will engage the leg grips 30 near the opposed perimeter walls 40, whereas the legs of narrower ramps will engage the leg grips 30 further towards the center portion of the pad 12.

The elongated tire gripper section 40 preferably includes a plurality of raised nodules 32 to enhance the frictional engagement of the tire 44 as it passes over the elongated tire gripper section 48, as is best seen in FIG. 2. As mentioned above, this elongated tire gripper section 48 prevents the ramp 16 from being pushed away by the advancing tire 44 in the direction of arrow 46. Without this elongated tire gripper section 48 in pad 12, there would be an increased chance of the ramp 16 being pushed away from the advancing tire 44.

To further enhance the anti-slip properties of the ramp pad 12, a second ramp pad 14 can be placed under the rear legs 26, 28 of ramp 16, as shown in FIGS. 1 and 2. This second, or rear leg, ramp pad 14 is shown in detail in FIG. 4 and is similar to the anti-slip pad 12 described above, except that this second pad 14 does not have an elongated tire gripper section 48. This second, or rear leg, ramp pad 14 comprises a base 38 surrounded on all four sides by perimeter wall 42, which helps to locate the rear legs 26, 28 of ramp 16 on the pad 14 and provides added dimensional stability to the pad. A series of elongated raised rear leg grips 34 extend from each side wall 42 toward the center portion of the pad 14 and are likewise sized and spaced to engage the rear legs of a wide variety of automobile service ramps, as described above for the first pad 12. In the preferred embodiment, a series of raised nodules 32 are also molded into the base 38 of rear leg ramp pad 14 to identify the rear leg ramp pad 14 with the first pad 12 and encourage users to utilize both pads simultaneously. Note, however, that the nodules 32 do not serve as friction enhancers as they did for the tire gripper section 48 of pad 12.

This concludes the detailed description of the anti-slip ramp pads 10 according to the present invention. While some of the obvious and numerous modifications and equivalents have been described herein, still other modifications and changes will readily occur to those skilled in the art. For instance, in the preferred embodiment the first and second ramp pads 12, 14 are molded from polyvinyl chloride (PVC), with a durometer of about 75 on the "A" scale, which has sufficient resiliency to provide enhanced frictional engagement with the floor, and the toughness to withstand substantial abuse. Other materials, such as rubber or polyurethane, could also be used with equal effectiveness, so long as such other materials provide the necessary resiliency and toughness. Therefore, the anti-slip pads 10 according to the present invention should not be regarded as limited to polypropylene. Still other changes and modifications are possible. For example, other captivating features besides the elongated leg grips shown and described herein could be used to engage and retain the ramp legs with equal effectiveness. Similarly, other friction enhancing features, or even none at all, could be used to replace the function of the raised nodules on the elongated tire gripper section, as would be obvious to those persons having ordinary skill in the art after becoming familiar with the details of this invention.

The foregoing is considered as illustrative only of the principles of this invention. Further, since numerous modifications and changes will readily occur to those skilled in the art, it is not desired to limit the invention to the exact construction and operation shown and described, and accordingly, all suitable modifications and equivalents may be considered as falling within the scope of the invention as defined by the claims which follow.

We claim:

1. An anti-slip automobile service ramp, comprising:

a ramp having an inclined section and a horizontal section supported by two inclined ramp legs and two rear legs;

a base pad positioned under and extending between the two inclined ramp legs;

a plurality of elongated, raised leg grips affixed to said base pad in parallel, spaced-apart relation, such that at least some of said elongated, raised leg grips engage and hold the inclined ramp legs; and an elongated tire gripper section attached to said base pad and extending outward from the inclined ramp legs, whereby a tire moving up said ramp will roll over said elongated tire gripper section and prevent the ramp from sliding away from the tire.

2. The anti-slip automobile service ramp of claim 1, wherein said elongated tire gripper section includes a plurality of raised nodules to improve the frictional grip of the tire on said elongated tire gripper section.

3. The anti-slip automobile service ramp of claim 2, wherein said pad is made of polyvinyl chloride with a durometer of about 75 when measured on the "A" scale.

4. The anti-slip automobile service ramp of claim 3, including a raised perimeter wall disposed around said base.

5. The anti-slip automobile service ramp of claim 4, including a second base pad positioned under and extending between the two rear legs, said second base pad including a plurality of elongated, raised rear leg grips in parallel, spaced-apart relation, such that at least some of said elongated, raised rear leg grips engage and hold the rear legs.

6. The anti-slip automobile service ramp of claim 5, wherein said second base pad is made of polyurethane.

7. The anti-slip automobile service ramp of claim 6, wherein said second base pad includes a raised perimeter wall.

8. An anti-slip automobile service ramp, comprising:

a ramp having an inclined section and a horizontal section supported by two inclined ramp legs and two rear legs;

a base pad positioned under and extending between the two inclined ramp legs, said base pad including a plurality of elongated, raised leg grips in parallel, spaced-apart relation, such that at least some of the elongated, raised leg grips engage and hold the inclined ramp legs; and an elongated tire gripper section attached to said base pad and extending outward from the inclined ramp legs, whereby a tire moving up said ramp will roll over said elongated tire gripper section and prevent the ramp from sliding away from the tire.

9. The anti-slip automobile service ramp of claim 8, wherein said elongated tire gripper section includes a plurality of raised nodules to improve the frictional grip of the tire on said elongated tire gripper section.

10. An anti-slip automobile service ramp, comprising:

a ramp having an inclined section and a horizontal section supported by two inclined ramp legs and two rear legs;

a first base pad positioned under and extending between the two inclined ramp legs, said first base pad including a plurality of elongated, raised leg grips affixed to said first base pad in parallel, spaced-apart relation, such that at least some of said elongated, raised leg grips engage and hold the inclined ramp legs;

an elongated tire gripper section attached to said first base pad and extending outward from the two inclined ramp legs, whereby a tire moving up said ramp will roll over said elongated tire gripper section and prevent the ramp from sliding away from the tire; and a second base pad positioned under and extending between the two rear legs, said second base pad having a plurality of elongated, raised rear leg grips affixed to said base in parallel, spaced-apart relation, such that at least some of said elongated, raised rear leg grips engage and hold the rear ramp legs.

* * * * *

UNITED STATES PATENT AND TRADEMARK OFFICE

CERTIFICATE OF CORRECTION

PATENT NO. : 5,248, 540

DATED : September 28, 1993

INVENTOR(S) : Jerome E. Speckeen, et al.

It is certified that error appears in the above-indentified patent and that said Letters Patent is hereby corrected as shown below:

On the title page, item (75) inventors: Jerome E. Speckman, should read -- Jerome E. Speckeen --.

Item (19): Speckman et al, should read --Speckeen et al.--.

Signed and Sealed this

Twenty-third Day of November, 1993

Attest:

BRUCE LEHMAN

Attesting Officer

Commissioner of Patents and Trademarks